United States Patent [19]

Kagaya et al.

[11] Patent Number: 5,084,508
[45] Date of Patent: Jan. 28, 1992

[54] RESIN COMPOSITION

[75] Inventors: Katsuo Kagaya, Chiba; Yoshifumi Hama, Sakai; Shichinosuke Ito, Izumi, all of Japan

[73] Assignee: Dainippon Ink & Chemicals, Inc., Tokyo, Japan

[21] Appl. No.: 344,613

[22] Filed: Apr. 28, 1989

[30] Foreign Application Priority Data

Apr. 28, 1988 [JP] Japan .................. 63-106161
May 12, 1988 [JP] Japan .................. 63-115526

[51] Int. Cl.$^5$ ............... C08L 67/06; C08L 67/07; C08L 63/10
[52] U.S. Cl. .................................. 525/31; 525/44; 525/48; 525/921; 525/922
[58] Field of Search ............... 525/31, 44, 921, 922

[56] References Cited

U.S. PATENT DOCUMENTS

| Re. 31,577 | 5/1984 | Riew | 525/44 |
| 3,733,370 | 5/1973 | Thompson | 525/44 |
| 4,350,789 | 9/1982 | Rowe | 525/31 |

*Primary Examiner*—Patricia Short
*Attorney, Agent, or Firm*—Oblon, Spivak, McClelland, Maier & Neustadt

[57] ABSTRACT

A resin composition comprising
(a) 40 to 80% by weight of a resin comprising
   an oligomer having a number average molecular weight of 900 to 3,000 in terms of polystyrene equivalent obtained by gel permeation chromatography and having two or more terminal (meth)acrylate groups and
   an unsaturated polyester, and
(b) 20 to 60% by weight of methyl (meth)acrylate monomer.

5 Claims, No Drawings

RESIN COMPOSITION

BACKGROUND OF THE INVENTION

1. Field of the Invention

This invention relates to a resin composition providing fast curing and being distinguished in crack resistance when used according to the resin transfer molding (which will be referred to as RTM or R-RIM in the following) which is one of the molding methods of fiber reinforced thermosetting plastics (which will be referred to as FRP in the following).

2. Prior Art

RTM features in that it permits low pressure, low temperature molding so that the equipment investment such as mold and press costs can be reduced. However, it has difficulties in productivity and moldability.

To satisfy these requirements, a resin composition distinguished in curing performance or of fast curing and in resistance to cracking is required. As such resin composition, an unsaturated polyester resin composition is cited in EP-A-234692 laid open on January 13, 1987. It is a polymeric composition comprising an unsaturated polyester, styrene and/or acrylate monomer and a compound having a (meth)acrylate group. However, such composition was intended for improvement of the odor of the unreacted, volatile unsaturated monomer (such as styrene) in the molded product and had thus difficulties in that the compound having the (meth)acrylate group was of a low molecular weight comprising no hydroxyl group so that if the curing time (time from addition of a hardener to maximum heat generation for hardening) were accelerated, the gelling time (time from addition of the hardener to loss of fluidity) would be extremely reduced, resulting in gelation occurring during the process of injection or cracking occurring in the molded product. To prevent cracking, a thermoplastic resin such as poly(vinyl acetate) or polystyrene was blended to the unsaturated monomer solution of an unsaturated polyester, or the content of the unsaturated acid in the unsaturated polyester was reduced, for adjustment of the concentration of cross-links. However, prevention of cracking with such method had the curing time extremely extended or the mechanical strength of the molded product greatly reduced. Thus, both productivity and moldability were hardly satisfied simultaneously.

SUMMARY OF THE INVENTION

As the results of intensive research with view to obtaining a resin composition which would satisfy both fast curing and moldability simultaneously, the present inventors have completed a resin composition distinguished in fast curing performance and crack resistance in molding by dissolving in methyl (meth)acrylate monomer a mixture of an unsaturated polyester and an oligomer of a particular molecular weight with a terminal of (meth)acrylate group, said mixture being dissolved in methyl (meth)acrylate monomer.

Therefore, the present invention provides a fast curing and crack resistant resin composition comprising (a) 40 to 80% by weight of a resin comprised of an oligomer of a number average molecular weight of 900 to 3,000 in terms of polystyrene equivalent obtained by gel permeation chromatography (GPC) with the terminal being two or more (meth)acrylate groups and an unsaturated polyester and (b) 20 to 60% by weight of methyl (meth)acrylate monomer.

DETAILED DESCRIPTION OF THE INVENTION

The unsaturated polyester which can be used in the present invention refers to an unsaturated polyester which contains 20 to 70% by weight of an unsaturated dibasic acid and is obtainable through reaction between an acid component containing a saturated polybasic acid, if desired, and a polyhydric alcohol component in an equivalent proportion of 1:1. If the unsaturated dibasic acid is less than 20% by weight, the curing performance is degraded, and if it is greater than 70% by weight, the crack resistance is deteriorated. Examples of such unsaturated dibasic acid component constituting the unsaturated polyester include well-known and generally used $\alpha,\beta$-unsaturated dibasic acids such as maleic acid, fumaric acid, itaconic acid, citraconic acid, metaconic acid and chlorinated maleic acid or anhydrides thereof.

Among the unsaturated dibasic acids, maleic anhydride is preferred.

Examples of the saturated polybasic acid component which can be used concurrently in the present invention together with the unsaturated dibasic acids, if desired, include generally known and conventionally used saturated acids or anhydrides or esters thereof such as phthalic acid, phthalic anhydride, tetrahydrophthalic anhydride, cis-3-methyl-4-cyclohexene-cis-1,2-dicarboxylic anhydride, isophthalic acid, terephthalic acid, dimethylterephthalic acid, mono-chlorophthalic acid, dichlorophthalic acid, trichlorophthalic acid, chlorendic acid (Het acid), tetrabromophthalic acid, sebacic acid, succinic acid, adipic acid, glutaric acid, pimelic acid, trimellitic acid and pyromellitic acid.

Examples of the alcohol component of the unsaturated polyester include listed generally known and conventionally used polyhydric alcohols such as, for example, ethylene glycol, diethylene glycol, triethylene glycol, polyethylene glycol, propylene glycol, dipropylene glycol, tripropylene glycol, polypropylene glycol, 1,3-butylene glycol, 2,3-butylene glycol, 1,4-butylene glycol, neopentyl glycol, hexylene glycol, octyl glycol, trimethylolpropane, glycerine, pentaerythritol, ethylene oxide or propylene oxide additive of hydroquinone, ethylene oxide- or propylene oxide-adduct of bisphenol A, hydrogenated bisphenol A and tricyclodecane dimethylol. Of these, propylene glycol is particularly preferred.

The oligomer having a terminal of (meth)acrylate group which can be used in the present invention is a compound, which is preferably in the form of a straight chain and has hydroxyl groups as side chains, the compound having (meth)acrylic acid, hydroxy(meth)acrylate or glycidyl (meth)acrylate introduced to the molecular chain, its side chains or both terminals of the main chain and containing 10% by weight or more or, more preferably, 20 to 40 % by weight, based on the weight of the oligomer, of (meth)acrylate group

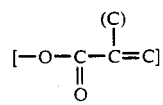

The number average molecular weight of the oligomer containing the (meth)acrylate group which can be used in the present invention corresponds to polystyrene equivalent measured according to GPC method, which is practically acceptable and used for convenience's sake although it would not always indicate accurate number average molecular weight of the polymer 900 to 3,000, and preferably 1,000 to 2,800. When the molecular weight is less than 900, the molded product which can be obtained has tackiness and is inferior in tensile strength and other physical properties, and when it is greater than 3,000, the molded product is apt to produce foams and take much time for molding, resulting in decrease of the productivity.

The oligomer of the present invention specifically refers to epoxy acrylates and polyester acrylates, preferably epoxy acrylates.

Such epoxy acrylate is an epoxy acrylate obtainable by reaction of a polyepoxide (epoxy resin) with an α,β-unsaturated monobasic acid in an equivalent proportion of 1:2. That is, it refers to an epoxy acrylate having a main chain of polyepoxide and both terminals of a (meth)acrylate group, respectively.

Representative examples of the polyepoxide (epoxy resin) include condensation products of polyphenols and (methyl)epichlorohydrin. For the polyphenols, there may be listed bisphenol A, 2,2'-bis(4-hydroxyphenyl)methane (bisphenol F), halogenated bisphenol A, resorcinol, tetrahydroxyphenylethane, phenol novolak, cresol novolak, bisphenol A novolak and bisphenol F novolak. There may also be listed epoxy compounds of the alcohol ether type obtainable from polyols such as ethylene glycol, butane diol, glycerine, polyethylene glycol, polypropylene glycol and alkylene oxide-adduct of bisphenols, and (methyl)epichlorohydrin; glycidyl amines obtainable from anilines such as diaminodiphenylmethane, diaminophenylsulfon and p-aminophenol, and (methyl)epichlorohydrin; glycidyl esters based on acid anhydrides such as phthalic anhydride and tetrahydro-or hexahydro-phthalic anhydride; and alicyclic epoxides such as 3,4-epoxy-6-methylcyclohexylmethyl and 3,4-epoxy-6-methylcyclohexyl carbonate. Compounds having a bisphenolic skeleton are preferred.

For the α,β-unsaturated monobasic acids, acrylic acid and methacrylic acid are representative.

The number average molecular weight of the epoxy acrylate is preferably 900 to 2,500, or more preferably 1,300 to 2,200. If the number average molecular weight is less than 900, the molded product has tackiness and is inferior in the physical properties, and if it is greater than 2,500, the molded product is apt to form foams and take much time for molding, resulting in degradation of the fast curing performance and thus in decrease of the productivity.

The unsaturated polyester acrylate having (meth)acrylate groups at the terminals which can be used in the present invention refers to an unsaturated polyester acrylate having an unsaturated glycidyl compound added to an unsaturated polyester obtainable through reaction of an acid component containing a saturated polybasic acid or its anhydride, if desired, an unsaturated polybasic acid or its anhydride with an alcohol component in an equivalent proportion of 2:1, or an unsaturated polyester acrylate having an unsaturated glycidyl compound added to an unsaturated polyester containing a carboxyl group at each terminal.

Examples of the unsaturated glycidyl compound constituting a component of the polyester include those that are generally known and conventionally used such as glycidyl esters of unsaturated monobasic acids of acrylic acid and methacrylic acid such as, for example, glycidyl acrylate and glycidyl methacrylate. For such unsaturated glycidyl compound, glycidyl methacrylate is preferred.

Examples of the dibasic acid component include any generally known and conventionally used saturated acids or their anhydrides or esters such as, for example, phthalic acid, phthalic anhydride, tetrahydrophthalic anhydride, cis-3-methyl-4-cyclohexene-cis-1,2-dicarboxylic anhydride, isophthalic acid, terephthalic acid, dimethylterephthalic acid, monochlorophthalic acid, dichlorophthalic acid, trichlorophthalic acid, chlorendic acid (Het acid), tetrabromophthalic acid, sebacic acid, succinic acid, adipic acid, glutaric acid, pimelic acid, trimellitic acid and pyromellitic acid. Isophthalic acid is preferred.

As the unsaturated polybasic acid or anhydride thereof to be used jointly, if desired, there may be listed generally known and conventionally used α,β-unsaturated polybasic acids such as maleic acid, fumaric acid, itaconic acid, citraconic, metaconic acid and chlorinated maleic acid, or anhydrides thereof.

Examples of the alcohol component of the polyester acrylate include polyhydric alcohols which are generally known and conventionally used such as ethylene glycol, diethylene glycol, triethylene glycol, polyethylene glycol, propylene glycol, dipropylene glycol, tripropylene glycol, polypropylene glycol, 1,3-butylene glycol, 2,3-butylene glycol, 1,4-butylene glycol, neopentyl glycol, hexylene glycol, octyl glycol, trimethylolpropane, glycerine, pentaerythritol, ethylene oxide- or propylene oxide-adduct of hydroquinone, hydrogenated bisphenol A and tricyclodecane dimethylol. Glycols of rigid structure having a bisphenol skeleton are particularly preferred.

The number average molecular weight of the unsaturated polyester acrylate is preferably 1,500 to 3,000, or more preferably 1,800 to 2,800. When the number average molecular weight is less than 1,500, the molded product may have teckiness or be degraded in tensile strength and other physical properties, and when it is greater than 3,000 the mold is apt to produce foams and take much time for molding, resulting in degradation of the fast curing performance and decrease of the productivity. When only an oligomer the terminal of which is a (meth)acrylate group is used as a resin, the molded product may be distinguished in fast curing, injection characteristic and crack resistance, but it may be inferior in physical properties such as tensile strength and tensile elasticity which may be required depending on its application.

According to the present invention, the weight based mixing proportion of the unsaturated polyester (a) and the oligomer containing terminal (meth)acrylate groups (b) is: (a):(b)=5:95 to 95:5, and preferably 20:80 to 80:20. When the unsaturated polyester is less than 5 parts by weight, sufficient tensile strength and modulus of elasticity are not obtainable, and when it is greater than 95 parts by weight, the curing characteristic is degraded.

The resin component used in the present invention, 40 to 80% by weight, and preferably 50 to 70% by weight. When it is less than 40% by weight, the curing characteristic is degraded, and the resin flowing out of the molded product has its surface remaining to be tacky, and when it is greater than 80% by weight, the viscosity increases to extend the molding time or decrease the cross-linking density, resulting in degradation of the tensile strength and other physical properties.

In the present invention, said resin is used preferably in an amount of 30 to 50% by weight dissolved in 20 to 60% by weight of methyl (meth)acrylate. This is also important as stated above. Use of methyl (meth)-acrylate is particularly important for obtaining the fast curing characteristic (molding time, about 3 minutes). However, any other vinylic monomer may be used jointly in such a small amount that the effect of the invention will not be impaired.

The resin composition of the present invention may contain various additives such as a thickener, coloring agent, reinforcing agent, filler, curing catalyst, curing accelerator, curing retarder, internal lubricant and/or low shrink agent, if desired.

The thickener should be such that it chemically bonds with the hydroxyl and carboxyl groups and ester bonds contained in the resin to form linear or partially cross-linking bonds and thus increase the molecular weight and the viscosity of the unsaturated polyester resin, and as such thickener, there may be listed diisocyanates such as toluene diisocyanate, metal alkoxides such as aluminum isopropoxide and titanium tetrabutoxide, oxides of divalent metals such as magnesium oxide, calcium oxide and beryllium oxide, and hydroxides of divalent metals such as calcium hydroxide. The amount of use of the thickener is normally 0.2 to 10 parts by weight, and preferably 0.5 to 4 parts by weight per 100 parts by weight of the resin composition. Also, there may be used a small amount of highly polar substance such as water as an auxiliary thickener, if desired.

As a coloring agent, any of the conventional organic and inorganic dyes and pigments can be used. However, such a coloring agent which is distinguished in heat resistance and transparency and does not impede curing of the unsaturated polyester and terminal (meth)acrylate group containing oligomer, is preferred.

For the reinforcing agent used in the present invention, fiber glass may be cited generally. However, organic fibers of Vinylon, polyester, phenol, poly(vinyl acetate), polyamide and poly(phenylene sulfide) and inorganic fibers of asbestos, carbon fiber, metal fiber and ceramic fiber, may cited. These may be in the forms of strand, knit and nonwoven fabric, planar or solid. The reinforcing agent is not limited to such fibers, and plastic foams such as polyurethane foam, phenol foam, vinyl chloride foam and polyethylene foam; hollow hardened products of glass and ceramics, and solids, molded products or honeycomb structures of metals, ceramics, plastics, concrete, wood and paper, can also be used.

Example of the filler include calcium carbonate powder, clay, alumina powder, silica, talc, barium sulfate, silica powder, glass powder, glass beads, mica, aluminum hydroxide, cellulose filament, quartz sand, river sand, white marble, marble scraps and crushed stone. Of these, glass powder, aluminum hydroxide and barium sulfate are particularly preferred in that they provide semi-transparency in curing.

To accelerate the curing, a metal compound may be added to the resin composition, if desired, and for such metal compound, metal compound accelerators used generally for unsaturated polyester resins are used. Their examples include cobalt naphthonate, cobalt octonate, divalent acetylacetone cobalt, trivalent acetylacetone cobalt, potassium hexoate, zirconium naphthonate, zirconium acetylacetonate, vanadium naphthonate, vanadium octonate, vanadium acetylacetonate and lithium acetylacetonate, and combinations thereof. Also, such accelerator may be used in combination with any other conventional accelerators such as amines, phosphorus containing compounds, and $\beta$-diketones.

The amount of addition of such curing accelerator is subject to adjustment with the gelling time, but it is preferably 0.0001 to 0.12 part by weight as a metal component per 100 parts by weight of the resin composition. In the case of molding at a medium temperature or higher (40° C. or higher), this curing accelerator may be used or omitted.

Examples of the curing catalyst include such compounds which act on the unsaturated polyester or terminal (meth)-acrylate group containing oligomer, including azo compounds such as azoisobutyrlonitrile and organic peroxides such as tertiary butyl perbenzoate, tertiary butyl peroctoate, benzoyl peroxide, methyl ethyl ketone peroxide, acetoacetic ester peroxide and dicumyl peroxide. The catalyst is used in an amount of 0.1 to 4 parts by weight, or preferably 0.3 to 3 parts by weight, per 100 parts by weight of the resin composition.

Redox curing agents such as acetoacetic ester peroxide/cobalt naphthenate and benzoyl peroxide/dimethyl p-toluidine are particularly preferred.

For the curing retarder, there may be listed hydroquinone, toluhydroquinone, tertiary-butylcatechol and copper naphthenate, and such compound is preferably used in an amount or 0.0001 to 0.1 part by weight per 100 parts by weight of the resin composition.

For the internal lubricant, there may be listed the conventional higher fatty acids and higher fatty acid esters such as stearic acid and zinc stearate and alkyl phosphoric esters. Such lubricant can be used in a proportion of normally 0.5 to 5 parts by weight per 100 parts of the resin composition.

For the low shrinkage agent, there may be listed such thermoplastic resins as homopolymers or copolymers of lower alkyl esters of acrylic or methacrylic acid such as methyl methacrylate, ethyl methacrylate, butyl methacrylate, methyl acrylate and ethyl acrylate, and monomers of styrene, vinyl chloride and vinyl acetate; copolymers of at least one of said vinyl monomers and at least one of monomers comprising lauryl methacrylate, isovinyl methacrylate, acrylamide, methacrylamide, hydroxyalkyl acrylate or methacrylate, acrylonitrile, methacrylonitrile, acrylic acid, methacrylic acid and cetylstearyl methacrylate; and further cellulose acetate butyrate and cellulose acetate propionate, polyethylene, polypropylene and saturated polyesters. These may be added, if desired for particular use, so long as the effect of the invention is not impaired.

The resin composition of the present invention may be cured with heat with various peroxides added or by ultraviolet ray or any other active light with various photo sensitive agents added and is fast curing and distinguished in mechanical strength.

The resin composition according to the present invention is of a viscosity of preferably 3 poise or less at 25° C. But, it is not always required to be 3 poise or less at room temperature. So long as the effect of the invention is achieved, it may have the viscosity reduced to 3 poise or less by heating or otherwise at the time of injection to the mold. This viscosity allows injection to the R-RIM molding machine with ease. If the viscosity is greater than 3 poise, much time is required for injection, and so the productivity is decreased.

According to the present invention, the molded product is produced by dividing the resin composition into two parts, adding a curing agent (peroxide) to one part (component A) and an accelerator to the other (component A'), circulating these two components A and A' in separate lines respectively under a high pressure (injection pressure) of preferably 5 to 200 kg/cm$^2$ or more preferably 80 to 150 kg/cm$^2$, and injecting them in a short time of preferably 0.1 to 30 seconds or more preferably 0.5 to 20 seconds into a mold having a reinforcing agent charged and maintained at a mold temperature of preferably 10° to 80° C. or more preferably 40° to 70° C. and a mold pressure of preferably 5 to 100 kg/cm$^2$ or more preferably 20 to 50 kg/cm$^2$.

According to the invention, molding is performed at a molding temperature of 80° C. or less (mold temperature). If molded at a temperature higher than 80° C., the methyl (meth)acrylate monomer is subject to evaporation to produce air bubbles in, or voids on the surface of, the molded product, resulting in cracking, and so such temperature is not desirable.

Also, according to the invention, the molded product has a reinforcing agent charged before it is locked and has the composition injected. Here, according to the prior art in which the reinforcing agent was added to the composition before injection, it was difficult to provide a high strength as the reinforcing agent was of a fibrous form. Also, according to the conventional RTM, when a reinforcing agent in the form of long filaments was used, if the injection time is reduced, it was caused to flow on account of the high viscosity of resin composition so that the mechanical strength was not evenly distributed, resulting in a product of poor quality. According to the present invention, such problem is eliminated, and a uniform molded product having a high mechanical strength can be obtained.

The number average molecular weight specified in the invention refers to that value of GPC (gel permeation chromatography) which is determined under the following condition of measurement.

GPC: Product of Japan Analytical Industry, Model LC-08
Column: SHODEX A-804+A-803+A-802+A-801 (product of Showa Denko)
Solvent: THF (tetrahydrofuran)
Standard sample for calibration curve: Polystyrene (product of Toso)
Detector: Differential refractometer (product of Japan Analytical Industry)

The resin composition of the present invention may be cured with heat with various peroxides added or by ultraviolet ray or any other active light with various photo sensitizers added, and the cured molded product has very little foam and an excellent mechanical strength.

The resin composition of the present invention is distinguished in fast curing characteristic and crack resistance and is very excellent for RTM.

EXAMPLE

Now, the present invention will be described in detail with reference to reference examples and examples. It should be noted that the "parts" in the following show the parts by weight.

Reference Example 1

(Preparation of unsaturated polyester [PE-1])

Heating, dehydrating and condensating 540 g of maleic anhydride and 460 g of 1-2 propylene glycol in an inert gas at 220° C. for 10 hours, there was obtained a condensation product giving an acid value of 30. To this, 0.15 g of hydroquinone was added, and the mixture was cooled to 120° C. Then, this solid was dissolved in 600 g of methyl methacrylate monomer, and there was obtained an unsaturated polyester of non-volatile component 60.2%, viscosity 3.8 poises (at 25° C.) and acid value 18.6 with the content of unsaturated dibasic acid at 59.9% by weight.

Reference Example 2

(preparation of unsaturated polyester [PE-2])

Heating, dehydrating and condensating 237 g of maleic anhydride, 358 g of phthalic anhydride and 405 g of 1-2 propylene glycol in an inert gas at 220° C. for 10 hours, there was obtained a condensation product giving an acid value of 28. To this, 0.15 g of hydroquinone was added, and the mixture was cooled to 120° C. Then, this solid was dissolved in 390 g of methyl methacrylate monomer, and there was obtained an unsaturated polyester of solid component 70.1% viscosity of 4.0 poises (at 25° C.) and acid value of 17 with the content of unsaturated dibasic acid at 26% by weight.

Reference Example 3

(Preparation of unsaturated polyester [PE-3])

Heating, dehydrating and condensating 152 g of maleic anhydride, 459 g of phthalic anhydride and 389 g of 1-2 propylene glycol in an inert gas at 220° C. for 10 hours, there was obtained a condensation product giving an acid value of 25. To this, 0.15 g of hydroquinone was added, and the mixture was cooled to 120° C. Then,. this solid was dissolved in 600 g of methyl methacrylate monomer, and there was obtained an unsaturated polyester of solid component 60%, viscosity 6.2 poises (at 25° ) and acid value 15 with the content of unsaturated dibasic acid at 16.6% by weight.

Reference Example 4

(preparation of unsaturated polyester [PE-4])

Heating, dehydrating and condensating 540 g of maleic anhydride and 460 g of 1-2 propylene glycol in an inert gas at 220° C. for 10 hours, there was obtained a condensation product giving an acid value of 29. To this, 0.15 g of hydroquinone was added, and the mixture was cooled to 120° C. Then, this solid was dissolved in 600 g of styrene monomer, and there was obtained a styrene type unsaturated polyester having a resin solid component of 59.8%, viscosity of 6.2 poises (at 25° C.) and acid value of 16.5 with the content of unsaturated dibasic acid at 59.9% by weight.

Reference Example 5

(Preparation of epoxy acrylate [AC-1])

Introducing in a three-necked flask provided with a thermometer, stirrer and cooler 1,850. g of EPICLON ® 850 (epoxy resin product of Dainippon Ink & Chemicals, Inc) obtained through reaction of bisphenol A with epichlorohydrin with an epoxy equivalent of 185 (equivalent to 10 epoxy groups), 860 g of methacrylic acid (equivalent to 10 carboxyl groups), 1.36 g of hydroquinone and 10.8 g of triethylamine, the mixture was heated to 120° C. and allowed to react at the same temperature for 10 hours, and there was obtained liquid epoxy acrylate with an acid value of 3.5, epoxy equivalent of 15,000 or more and color number of 2. Then, dissolving this epoxy acrylate in 2,217 g of methyl methacrylate monomer, there was obtained 4,920 g of epoxy acrylate of the non-volatile component at 55%, acid value at 2, viscosity at 2 poises at 25° C. and (meth) acrylate group content in the solid at 31.4% by weight.

Reference Example 6

(Preparation of unsaturated polyester acrylate [AC-2])

Heating, dehydrating and condensating 166 g (1 mol) of isophthalic acid and 152 g (2 mols) of 1-2 propylene glycol in an inert gas at 220° C. for 10 hours, there was obtained a reaction product having a solid component of an acid value of 5. Then, it was cooled to 100° C. Next, 196 g (2 mols) of maleic anhydride was charged, and through heating, dehydration and condensation at 200° C. for 5 hours, there was obtained a reaction product having a solid component of an acid value of 254. To this, 0.15 g of hydroquinone was added, and the mixture was cooled to 140° C. Next, 284 g (2 mols) of glycidyl methacrylate was charged, and through reaction at 140° C. for 10 hours, there was obtained a solid reaction product of an acid value of 10. Dissolving this unsaturated polyester acrylate in 508 g of methyl methacrylate monomer, there was obtained 1,270 g of an unsaturated polyester acrylate with a non-volatile component of 60.5%, viscosity of 0.5 poise at 25° C., acid value of 6.1 and the acrylate group content in the solid at 23.4% by weight.

Reference Example 7

(Preparation of styrene type epoxy acrylate [AC-3]

Introducing in a three-necked flask provided with a thermometer, stirrer and cooler 1,850 g of EPICLON ® 850 (epoxy resin product of Dainippon Ink & Chemicals, Inc) obtained through reaction of bisphenol A and epichlorohydrin with each other with an epoxy equivalent of 185 (equivalent to 10 epoxy groups), 860 g of methacrylic acid (equivalent to 10 carboxyl groups), 1.36 g of hydroquinone and 10.8 g of triethylamine, the mixture was heated to 120° C. and allowed to react at the same temperature for 10 hours, and there was obtained liquid epoxy acrylate with an acid value of 3.5, epoxy equivalent of 15,000 or more and color number of 2. Dissolving this solid in 1,800 g of styrene monomer, there was obtained 4,500 g of styrene type epoxy acrylate of a non-volatile component of 60.3%, acid value of 2.1, viscosity of 10 poises at 25° C. with the methacrylate group content in the solid at 31.4 5 by weight.

Reference Example 8

(Preparation of unsaturated polyester acrylate ([AC-4])

Heating, dehydrating and condensating 133 g (0.8 mol) of isophthalic acid, 76 g (1 mol) of 1,2-propylene glycol, and 324 g (1 mol) of ethylene oxide 2 mol adduct of bisphenol A in an inert gas at 220° C. for 9 hours, there was obtained a solid product of an acid value of 3. This was cooled to 100° C. Then, charging 147 g (1.5 mols) of maleic anhydride, and heating, dehydrating and condensating at 200° C. for 6 hours, there was obtained a solid product of an acid value of 37. To this, 0.16 g of hydroquinone was added, and the mixture was cooled to 140° C. Next, 85 g (0.6 mol) of glycidyl methacrylate was charged, and through reaction at 140° C. for 6 hours, there was obtained a solid product of na acid value of 10. This unsaturated polyester acrylate was dissolved in 456 g of methyl methacrylate monomer, and there was obtained 1,088 g of an unsaturated polyester acrylate product of a non-volatile component of 60.2%, acid value of 6, viscosity of 20 poise at 25° C. with the acrylate group content in the solid at 7.2% by weight.

Reference Example 9

(Preparation of epoxy acrylate [AC-5])

Using 5,000 g of EPICLON ® 1050 of an epoxy equivalent of 500 in place of EPICLON ® 850 in Reference Example 5, 860 g of methacrylic acid, 2.93 g of hydroquinone and 21.6 g of triethylamine, a solid epoxy acrylate product was obtained as in Reference Example 5. Dissolving this epoxy acrylate in 4,975 g of methyl methacrylate monomer, there was obtained 10,835 g of epoxy acrylate of a non-volatile component of 55%, acid value of 2, viscosity of 2.8 poises (25° C.) with the (meth) acrylate group content at 14.7% by weight.

Characteristics of the resin compositions obtained in Reference Examples 1 through 9 are shown in Table 1.

TABLE 1-1

| | Resin (1–17) | | | | | | | | |
|---|---|---|---|---|---|---|---|---|---|
| | Charge compositions (A–K) | | | | | | | | |
| | A | B | C | D | E | F | G | H | I |
| | Unsaturated polyester | | | | | | | | |
| Reference Example 1 PE-1 | 460 | | | 540 | | | | | 901 |
| Reference Example 2 PE-2 | 405 | | 358 | 237 | | | | | 913 |
| Reference Example 3 PE-3 | 389 | | 459 | 152 | | | | | 916 |
| Reference Example 4 PE-4 | 460 | | | 540 | | | | | 900 |
| | Terminal (meth)acrylate group containing oligomer | | | | | | | | |
| Reference Example 5 AC-1 | | | | | | | 1850* | 860 | 2710 |
| Reference Example 6 | 152 | 166 | 196 | 284 | | | | | 762 |

TABLE 1-1-continued

| | Resin (1-17) Charge compositions (A-K) | | | | | | | | |
|---|---|---|---|---|---|---|---|---|---|
| | A | B | C | D | E | F | G | H | I |
| AC-2 Reference Example 7 | | | | | | | 1850* | 860 | 2710 |
| AC-3 Reference Example 8 | 76 | 324 | 133 | | 147 | 85 | | | 632 |
| AC-4 Reference Example 9 | | | | | | | 5000** | 860 | 5860 |
| AC-5 | | | | | | | | | |

A - 1,2-Propylene glycol
B - Ethylene oxide (2 mols) adduct of bisphenol A
C - Isophtalic acid
D - Orthophtalic anhydride
E - Maleic anhydride
F - Glycidyl methacrylate
G - *EPICLON ® 850
**EPICLON ® 1050
H - Methacrylic acid
I - Total of resin solid component

TABLE 1-2

| | Change Composition | | Characteristics (L-Q) | | | | | |
|---|---|---|---|---|---|---|---|---|
| | J | K | L | M | N | O | P | Q |
| Unsaturated Polyester | | | | | | | | |
| Reference Example 1 PE-1 | 600 | | 60.2 | 18.6 | 3.8 | 59.9 | | 2250 |
| Reference Example 2 PE-2 | 390 | | 70.1 | 17 | 4.0 | 26 | | 1892 |
| Reference Example 3 PE-3 | 600 | | 60 | 15 | 2.8 | 16.6 | | 1950 |
| Reference Example 4 PE-4 | | 600 | 59.8 | 16.5 | 6.2 | 59.9 | | 2250 |
| Terminal (meth)acrylate group containing oligomer | | | | | | | | |
| Reference Example 5 AC-1 | 2217 | | 55 | 2 | 2 | | 31.4 | 918 |
| Reference Example 6 AC-2 | 498 | | 60.5 | 6.1 | 0.5 | | 23.4 | 1952 |
| Reference Example 7 AC-3 | | 1800 | 60.3 | 2.1 | 10 | | 31.4 | 1487 |
| Reference Example 8 AC-4 | 456 | | 60.2 | 6 | 20 | | 7.2 | 3363 |
| Reference Example 9 AC-5 | 4975 | | 55 | 2 | 2.8 | | 14.7 | 2400 |

J - Methyl methacrylate monomer
K - Styrene monomer
L - Resin solid component (%)
M - Acid value (mg · KOH/g)
N - Viscosity (poise at 25° C.)
O - Content of unsaturated dibasic acid (%) in solid component
P - Content of (meth)acrylate groups (%) in solid component
Q - Number average molecular weight

EXAMPLE 1

As Example 1, the resin VE-1 obtained in Reference Example 1, acetoacetic ester peroxide (PERCURE SA, product of Nippon Oil & Fats Co., Ltd.) and 6% cobalt naphthenate were compounded in a proportion shown in Table 2. The results are shown in Table 2. Examples 2 to 5 and Comparative Examples 1 to 7 were carried out similarly to Example 1. Measurement of the characteristics was made according to the methods shown below.

Curing performance: Obtained from a torque-time curve at 50° C. with CURELASTOMETER III (product of Japan Synehetic Rubber Company) used.

Viscosity: Stationary flow viscometer at 25° C. (REOMETER IR-200, product of Iwamoto Seisakusho Co., Ltd.)

RTM molding test: charging a preforming mat adjusted to a glass content of 30% by weight to a 600×800 mm box type electro-formed nickel/copper mold with epoxy resin backing, the mold was locked at 20 kg/cm$^2$.

Injection of the resin into the mold was made with an injector, Model IP-6000 of Applicator Co., used, and the duration from the time of start of the injection to the time of the resin flowing out of the clearance on the opposite side was taken as the injection time and shown as such.

As seen from Table 2, the resin compositions of the present invention were distinguished in the fast curing performance, crack resistance, tensile strength, tensile modulus of elasticity and Barcol hardness.

TABLE 2-1

| | Resin composition (A-B) | | | | Curing Agent (C-F) (Parts by weight) | | | |
|---|---|---|---|---|---|---|---|---|
| | A | | B | | C | D | E | F |
| Example | | | | | | | | |
| 1 | PE-1 | 70 | AC-1 | 30 | 1.0 | 0.2 | — | — |
| 2 | PE-1 | 70 | AC-1 | 30 | — | — | 3.0 | 0.3 |
| 3 | PE-2 | 10 | AC-2 | 90 | 1.0 | 0.2 | — | — |
| 4 | PE-2 | 50 | AC-2 | 50 | 1.0 | 0.2 | — | — |
| 5 | PE-1 | 60 | AC-5 | 40 | 1.0 | 0.2 | — | — |
| Comparative Example | | | | | | | | |
| 1 | PE-3 | 60 | AC-1 | 40 | 1.0 | 0.2 | — | — |
| 2 | PE-1 | 100 | — | | 1.0 | 0.2 | — | — |
| 3 | PE-1 | 70 | AC-3 | 30 | 1.0 | 0.2 | — | — |
| 4 | PE-4 | 15 | AC-3 | 85 | 1.0 | 0.2 | — | — |
| 5 | PE-1 | 50 | AC-4 | 50 | 1.0 | 0.2 | — | — |
| 6 | PE-1 | 70 | Trimethylolpropane trimethacrylate | 30 | 1.0 | 0.2 | — | — |
| 7 | PE-1 | 50 | Trimethylolpropane trimetha- | | 1.0 | 0.2 | — | — |

TABLE 2-1-continued

| Resin composition (A-B) | | Curing Agent (C-F) (Parts by weight) | | | |
|---|---|---|---|---|---|
| A | B | C | D | E | F |
| | crylate 50 | | | | |

A - Unsaturated polyester resin (I-A)
B - Terminal (meth)acrylate group containing oligomer (I-B)
C - Acetoacetic ester peroxide
D - 6% Cobalt naphthenate
E - 50% Benzoyl peroxide
F - Dimethyl-para-toluidine

TABLE 2-2

| | Molding Conditions (G-J) | | | | Results (K-O) | | | | |
|---|---|---|---|---|---|---|---|---|---|
| | G | H | I | J | K | L | M | N | O |
| Example | | | | | | | | | |
| 1 | 3.0 | 100 | 30 | 300 | | | 13.1 | 1200 | 47 |
| 2 | 3.0 | 120 | 30 | 300 | | | 13.5 | 1250 | 45 |
| 3 | 1.2 | 90 | 18 | 300 | | | 12.5 | 1150 | 47 |
| 4 | 1.8 | 130 | 21 | 300 | | | 12.7 | 1010 | 46 |
| 5 | 2.9 | 105 | 30 | 300 | | | 13.3 | 1238 | 46 |
| Comparative Example | | | | | | | | | |
| 1 | 2.3 | 900 | 25 | 1500 | x | x | 10.0 | 870 | 35 |
| 2 | 3.8 | 810 | 35 | 1500 | x | x | 12.8 | 1000 | 36 |
| 3 | 3.0 | 1200 | 27 | 1500 | x | x | 10.5 | 950 | 39 |
| 4 | 10 | 600 | 90 | 1500 | | x | 13.0 | 1100 | 40 |
| 5 | 12 | 600 | 122 | 1500 | | x | 10.9 | 900 | 38 |
| 6 | 1.0 | 1200 | 15 | 2400 | | x | 8.2 | 600 | 35 |
| 7 | 0.7 | 1800 | 10 | 2400 | | x | 7.6 | 550 | 32 |

G - Viscosity at 25° C. (poise)
H - Cure characteristic at 50° C. (seconds)
I - Injection time (second)
J - Molding time (second)
K - Crack resistance*
L - Curing**
M - Tensile strength (kg/mm$^2$)
N - Tensile modulus of elasticity (kg/mm$^2$)
O - Barcol hardness 934-1
Judgment criteria
*Cracking : No cracking x: Cracking
**Barcol hardness : 45 or higher x: 45 or less (undercure)

Reference Example 10

(Preparation of unsaturated polyester acrylate [PEA-1])

Heating, dehydrating and condensating 166 g (1 mol) of isophthalic acid and 152 g (2 mols) of 1-2 propylene glycol in an inert gas at 220° C. for 10 hours, there was obtained a condensation product with a solid component of an acid value of 5. This was cooled to 100° C. Then, charging 196 g (2 mols) of maleic anhydride and through heating, dehydration and condensation at 200° C. for 5 hours, a solid of an acid value of 254 was obtained. To this, 0.15 g of hydroquinone was added, and the mixture was cooled to 140° C.

Next, charging 284 g (2 mols) of glycidyl methacrylate, and reacting at 140° C. for 10 hours, a solid of an acid value of 10 was obtained. Dissolving this solid in 508 g of methyl methacrylate monomer, there was obtained 1,270 g of an unsaturated polyester acrylate of a non-volatile component, 60.5%; viscosity, 0.5 poise at 25° C.; acid value, 6.1; and acrylix double bond content in the solid component, 6.3%.

Reference Example 11

(Preparation of styrene type unsaturated polyester acrylate [PEA-2])

Dissolving a similar solid of acid value 10 to that in Reference Example 1 in styrene monomer, there was obtained a styrene type unsaturated polyester acrylate of a non-volatile component, 60%; viscosity, 10 poises; acid value, 6.2; and acrylic double bond content in the solid component, 6.3%.

Reference Example 12

(Preparation of unsaturated polyester acrylate [PEA-3])

Heating, dehydrating and condensating 166 g (1 mol) of isophthalic acid, 76 g (1 mol) of 1-2 propylene glycol and 324 g (1 mol) of ethylene oxide 2 mol additive of bisphenol A in an inert gas at 220° C. for 15 hours, there was obtained a solid of an acid value of 5. This was cooled to 100° C. Then, charging 196 g (2 mol) of maleic anhydride and through reaction at 200° C. for 6 hours, a solid having an acid value of 163 was obtained. To this, 0.2 g of hydroquinone was added, and the mixture was cooled to 140° C. Next, 284 g (2 mols) of glycidyl methacrylate was charged and reacted at 140° C. for 10 hours. A solid having an acid value 8 was obtained. This solid was dissolved in 683 g of methyl methacrylate monomer, and there was obtained 1,683 g of an unsaturated polyester acrylate of a non-volatile component, 61%; viscosity, 2 poises at 25° C.; acid value, 5.8; and acrylic double bond content in the solid component, 4.8%.

Reference Example 13

(Preparation of unsaturated polyester acrylate [PEA-4])

Heating, dehydrating and condensating 166 g (1 mol) of isophthalic acid, 76 g (1 mol) of 1-2 propylene glycol and 324 g (1 mol) of ethylene oxide 2 mol additive of bisphenol A in an inert gas at 220° C. for 15 hours, a solid of an acid value of 4 was obtained. This was cooled to 100° C. Then, 147 g (1.5 mols) of maleic anhydride was charged and heated, hydrated and condensated at 200° C. for 6 hours. A solid having an acid value of 85 was obtained. To this, 0.16 g of hydroquinone was added, and the mixture was cooled to 140° C. Next, 142 g (1 mol) of glycidyl methacrylate was charged for reaction at 140° C. for 10 hours, and a solid having an acid value of 8 was obtained. This solid was dissolved in 546 g of methyl methacrylate monomer, and there was obtained 1,365 g of an unsaturated polyester acrylate of a non-volatile component, 61.5%; viscosity, 4 poises at 25° C.; acid value, 4.9; and acrylic double bond content in the solid component, 2.9%.

Reference Example 14

(Preparation of unsaturated polyester acrylate [PEA-5])

Heating, dehydrating and condensating 133 g (0.8 mol) of isophthalic acid, 76 g (1 mol) of 1-2 propylene glycol and 324 g (1 mol) of ethylene oxide (2 mol) adduct of bisphenol A in an inert gas at 220° C. for 9 hours, there was obtained a solid having an acid value of 3. Then, 147 g (1.5 mols) of maleic anhydride was charged and heated, dehydrated and condensated at 200° C. for 6 hours, and a solid having an acid value of 37 was obtained. To this, 0.16 g of hydroquinone was added, and the mixture was cooled to 140° C. Next, 85 g (0.6 mol) of glycidyl methacrylate was charged and reacted at 140° C. for 6 hours, and a solid having an acid value of 10 was obtained. Dissolving this solid in 456 g of methyl methacrylate monomer, there was obtained 1,088 g of an unsaturated polyester acrylate of a non-volatile component, 60.2%; acid value, 6; viscosity, 20 poises at 25° C.; and acrylic double bond content in the solid component, 2.0%.

Reference Example 15

(Preparation of epoxy acrylate [VE-1])

Charging into a three-necked flask provided with a thermometer, stirrer and cooler 1,850 g of EPICLON ® 850 (epoxy resin product of Dainippon Ink & Chemicals, Inc.) obtained through reaction of bisphenol A with epichlorohydrin with an epoxy equivalent of 185 (equivalent to 10 epoxy groups), 860 g of methacrylic acid (equivalent to 10 carboxyl groups), 1.36 g of hydroquinone and 10.8 g of triethylamine, the mixture was heated to 120° C. and allowed to react at the same temperature for 10 hours, and there was obtained a liquid epoxy acrylate having an acid value of 3.5, epoxy equivalent of 15,000 or more and color number of 2. Then, dissolving this epoxy acrylate in 1,800 g of methyl methacrylate monomer, there was obtained 4,510 g of an epoxy acrylate of a non-volatile component, 60%; acid value, 2; viscosity, 2 poises at 25° C.; and acrylic double bond content in the solid component, 8.9%.

Reference Example 16

(Preparation of epoxy acrylate [VE-2])

Charging into a reaction vessel similar to that in Example 15, 1,300 g of EPICLON ® 725 (epoxy resin product of Dainippon Ink & Chemicals, Inc.) obtained through reaction of a polyhydric alcohol with epichlorohydrine with an epoxy equivalent of 130 (equivalent to 10 epoxy groups), 860 g of methacrylic acid (equivalent to 10 carboxyl groups), 1.34 g of hydroquinone and 10.7 g of triethylamine, they were allowed to react at 110° C. for 8 hours, and there was obtained 2,160 g of an epoxy acrylate having an acid value of 5. Dissolving this epoxy methacrylate in 1,440 g of methyl methacrylate monomer, there was obtained 3,600 g of an epoxy acrylate of a non-volatile component, 61.2%; acid value, 3; viscosity, 0.5 poise; and acrylic double bond content in the solid component, 11%.

Reference Example 17

(Preparation of styrene type epoxy acrylate [VE-3])

A similar solid to that in Example 15 was dissolved in styrene monomer, and a styrene type epoxy acrylate of a non-volatile component, 59.8%: viscosity, 10 poises at 2520 C.; and acrylic double bond content in the solid component, 8.9%.

Reference Example 18

(Preparation of epoxy acrylate [VE-4])

Charging into a reaction vessel similar to that in Reference Example 15, 7,400 g of EPICULON ® 3050 (product of Dainippon Ink & Chemicals, Inc.) obtained through reaction of a polyhydric alcohol with epichlorohydrin with an epoxy equivalent of 740 (equivalent to 10 epoxy groups), 860 g of methacrylic acid, 5.1 g of hydroquinone and 41.3 g of trimethylamine, they were allowed to react at 140° C. for 12 hours, and there was obtained 8,260 g of an epoxy acrylate having an acid value of 5.3.

Dissolving this epoxy acrylate in 5,507 g of methyl methacrylate monomer, there was obtained 13,760 g of an epoxy acrylate of a non-volatile component, 60.5%; acid value, 3.2; viscosity, 20 poises; and acrylic double bond content in the solid component, 2.9%.

Reference Example 19

(Preparation of epoxy acrylate [VE-5])

The same procedures as in Reference Example 15 were repeated except that the proportion of the resin component to methyl methacrylate was changed as shown in Table 3-2.

TABLE 3-1

| | Charge Composition (I) (A–I) | | | | | | | | |
|---|---|---|---|---|---|---|---|---|---|
| | A | B | C | D | E | F | G | H | I |
| Epoxy equivalent | — | — | — | — | — | 185 | 130 | 740 | — |
| Polyester acrylate | | | | | | | | | |
| PEA-1 | 166 | 152 | — | 196 | 284 | — | — | — | — |
| PEA-2 | 166 | 152 | — | 196 | 284 | — | — | — | — |
| PEA-3 | 166 | 76 | 324 | 196 | 284 | — | — | — | — |
| PEA-4 | 166 | 76 | 324 | 147 | 142 | — | — | — | — |
| PEA-5 | 133 | 76 | 324 | 147 | 85 | — | — | — | — |
| PEA-6 | 166 | 76 | 324 | 196 | 284 | — | — | — | — |
| Epoxy acrylate | | | | | | | | | |
| VE-1 | — | — | — | — | — | 1850 | — | — | 860 |
| VE-2 | — | — | — | — | — | — | 1300 | — | 860 |
| VE-3 | — | — | — | — | — | 1850 | — | — | 860 |
| VE-4 | — | — | — | — | — | — | — | 7400 | 860 |
| VE-5 | — | — | — | — | — | 1850 | — | — | 860 |

A - Isophthalic acid
B - 1-2 Propylene glycol
C - Ethylene oxide (2 mols) adduct of bisphenol A
D - Maleic anhydride
E - Glycidyl methacrylate
F - EPICLON ® 850
G - EPICLON ® 725
H - EPICLON ® 3050
I - methacrylic acid

TABLE 3-2

| | Solvents (II) (J–K) | | | (I):(II) Proportion (w %) (M) | Characteristics (N–R) | | | | |
|---|---|---|---|---|---|---|---|---|---|
| | J | K | L | M | N | O | P | Q | R |
| Polyester acrylate | | | | | | | | | |
| PEA-1 | 763 | 508 | — | 60.5:39.5 | 60.5 | 6.1 | 0.5 | 22.3 | 1405 |
| PEA-2 | 763 | — | 508 | 60:40 | 60 | 6.2 | 10 | 22.3 | 1405 |
| PEA-3 | 1010 | 683 | — | 61:39 | 61 | 5.8 | 2 | 16.8 | 1952 |
| PEA-4 | 819 | 546 | — | 61.5:38.5 | 61.5 | 4.9 | 4 | 10.4 | 2680 |
| PEA-5 | 653 | 435 | — | 60.2:39.8 | 60.2 | 6 | 20 | 7.8 | 3663 |
| PEA-6 | 1010 | 433 | — | 70:30 | 70 | 6.9 | 3 | 16.8 | 1952 |
| Epoxy acrylate | | | | | | | | | |
| VE-1 | 2710 | 1800 | — | 60:40 | 60 | 2 | 3 | 31.4 | 1487 |

TABLE 3-2-continued

| | Solvents (II) (J-K) | | L | (I):(II) Proportion (w %) (M) | Characteristics (N-R) | | | | |
|---|---|---|---|---|---|---|---|---|---|
| | J | K | | M | N | O | P | Q | R |
| VE-2 | 2160 | 1440 | — | 61:39 | 61.2 | 3 | 0.5 | 39.3 | 807 |
| VE-3 | 2710 | — | 1800 | 59.8:40.2 | 59.8 | 1.9 | 10 | 31.4 | 1487 |
| VE-4 | 8260 | 5507 | — | 60.5:39.5 | 60.5 | 3.2 | 20 | 10.3 | 2690 |
| VE-5 | 2710 | 3300 | — | 45:55 | 45 | 1.8 | 0.5 | 31.4 | 1487 |

J - Total of resin solid component
K - Methyl methacrylate monomer
L - Styrene monomer
M - (a):(b) Proportion (w %)   a: Resin   b: monomer
N - Non-volatile component (%)
O - Acid value (mg · KOH/g)
P - Viscosity (poise at 25° C.)
Q - Acrylate group content (w %)
R - Number average molecular weight Characteristics of the resin compositions obtained in Reference Examples 10 through 18 are shown in Table 3.

Examples 6 through 13; Comparative Examples 8 through 16

As Example 6, the resin PEA-3, 100 parts by weight, obtained in Reference Example 12, was divided into two parts, each in 50 parts by weight. To one part of the resin, 6 parts by weight of 50% benzoyl peroxide was added, and to the other, 0.6 part by weight of dimethyl-para-toluidine was added, as shown in Table 4, and each resin solution was circulated to a four mixing head RIM injector under a pressure of 150kg/cm² and was injected to an aluminum mold having charged thereto a preforming mat preadjusted to a glass content of 50 % by weight, maintained at a mold temperature of 50° C. and locked under a pressure of 20kg/cm², and thus a mold product was obtained. Physical properties of the mold product thus obtained are shown in the same table.

Examples 7 through 10 and Comparative Examples 8 through 16 were carried out similarly to Example 6. Determination of the properties was made according to the following methods.

Curing performance: Obtained from a torque-time curve at 40° C. with CURELASTOMETER II (product of Japan Synthetic Rubber Company) used.

Viscosity: Stationary flow viscometer at 25° C. (REOMETER IR-200, product of Iwamoto Seisakusho Co., Ltd.)

Injection time and molding test: Charging a preforming mat adjusted to a glass content of 50% to a 50×100×0.3 cm aluminum mold, the mold was locked under 20kg/cm². Injection of the resin into the mold was made under an injection pressure of 150kg/cm² with a four mixing head RIM injector, product of Krauss-Maffei, used, and the duration from the time of start of the injection to the time of the resin flowing out of the clearance on the opposite side was taken as the injection time and shown as such.

Forming and tackiness: By visual observation.
Physical properties: JIS Designation K-6911.

TABLE 4-1

| | Resin compositions (in parts) | | | Curing agents (A to D) | | | |
|---|---|---|---|---|---|---|---|
| | | | | A | B | C | D |
| Example | | | | | | | |
| 6 | PEA-3 100 | | | 3 | 0.3 | — | — |
| 7 | PEA-4 100 | | | 3 | 0.3 | — | — |
| 8 | VE-1 100 | | | 3 | 0.3 | — | — |
| 9 | VE-1 100 | | | — | — | 1.0 | 0.15 |
| 10 | PEA-3 30 | VE-1 70 | | 3 | 0.3 | — | — |
| 11 | PEA-6 100 | | | 3 | 0.3 | — | — |
| 12 | VE-5 100 | | | 3 | 0.3 | — | — |
| 13 | VE-1 50 | PE-1 50 | | 3 | 0.3 | — | — |
| Comparative Example | | | | | | | |
| 8 | PEA-1 100 | | | 3 | 0.3 | — | — |
| 9 | PEA-2 100 | | | 3 | 0.3 | — | — |
| 10 | PEA-5 100 | | | 3 | 0.3 | — | — |
| 11 | VE-2 100 | | | 3 | 0.3 | — | — |
| 12 | VE-3 100 | | | 3 | 0.3 | — | — |
| 13 | VE-4 100 | | | 3 | 0.3 | — | — |
| 14 | Acrylurethane oligomer | 100 | | 3 | 0.3 | — | — |
| 15 | Hydroxyl group containing acryl oligomer/ Polyisocyanate, solution type | 100 | | (Note) | | | |
| 16 | VE-2 100 | | | 1.5 | 0.2 | | |

A - 50% Benzoyl peroxide
B - Dimethyl-para-toluidine
C - Acetoacetic ester peroxide
D - 6% Cobalt naphthenate
(Note)
(1) 6% Cobalt naphthenate: 0.1 (part)
(2) Dibutyl-tin-dilaurate: 0.1
(3) Tertiary butyl perbenzoate: 2.6
(4) Diphenylmethane diisocyanate: 51.1

| | Molding conditions (E and F) | | Results (G-N) | | | | | | | |
|---|---|---|---|---|---|---|---|---|---|---|
| | E | F | G | H | I | J | K | L | M | N |
| Example | | | | | | | | | | |
| 6 | 50 | 150 | 2 | 1'40" | 13" | 3'00" | No | No | 12.0 | 1300 |
| 7 | 50 | 150 | 3 | 2'00" | 18" | 3'00" | No | No | 13.2 | 1450 |
| 8 | 70 | 150 | 2 | 1'30" | 10" | 3'00" | No | No | 15.0 | 1500 |
| 9 | 50 | 150 | 2 | 1'10" | 13" | 3'00" | No | No | 15.3 | 1500 |
| 10 | 50 | 150 | 2 | 1'30" | 13" | 3'00" | No | No | 15.5 | 1480 |
| 11 | 50 | 150 | 3 | 3'00" | 30" | 5'00" | No | No | 10.8 | 1200 |
| 12 | 50 | 150 | 0.5 | 3'30" | 7" | 7'00" | No | Yes | 12.8 | 1050 |
| 13 | 50 | 150 | 2.3 | 1'40" | 25" | 3'00" | No | No | 16.0 | 1580 |

-continued

| | Molding conditions (E and F) | | Results (G-N) | | | | | | | |
|---|---|---|---|---|---|---|---|---|---|---|
| | E | F | G | H | I | J | K | L | M | N |
| Comparative Example | | | | | | | | | | |
| 8 | 50 | 150 | 1.2 | 1'40" | 10" | 3'00" | No | Yes | 11.2 | 1000 |
| 9 | 50 | 150 | 10 | 11'40" | 30" | 15'00" | (*) | Yes | 9.2 | 800 |
| 10 | 50 | 150 | 20 | 20'00" | 30 | 25'00" | (*) | Yes | 12.9 | 1100 |
| 11 | 50 | 150 | 0.5 | 3'20" | 7" | 5'00" | ** | Yes | 7.5 | 880 |
| 12 | 50 | 150 | 10 | 8'20" | 30" | 10'00" | No | Yes | 12.1 | 1200 |
| 13 | 50 | 150 | 20 | 15'30" | 30" | 3'00" | (*) | Yes | 13.8 | 1400 |
| 14 | 50 | 150 | 0.7 | 1'40" | 9" | 3'00" | No | Yes | 13.2 | 806 |
| 15 | 50 | 150 | 5 | 1'30" | 15" | 3'00" | *** | No | 7.2 | 800 |
| 16 | 100 | 150 | 2.3 | 1'00" | 7" | 7'00" | # | No | 15.1 | 1300 |

E - Mold temperature (°C.)
F - Injection pressure (kg/cm²)
G - Viscosity at 25° C. (poise)
H - Cure characteristic at 50° (min, sec)
Molding time at 50° (min, sec) (below I-N)
I - Injection time (sec)
J - Molding time (min, sec)
K - Mold product foaming
L - Burr tackiness
M - Tensile strength (kg/mm²)
N - Tensile modulus of elasticity (kg/mm²)
* - Improper impregnation
** - Much cavity
*** - More or less foaming
- Much foaming with cracking partially As seen from Table 4, Comparative Examples 8, 10, 11 and 13 using an unsaturated polyester acrylate or epoxy acrylate out of the range of the number average molecular weight of the present invention were inferior in the fast curing performance, moldability, foaming performance, tackiness and tensile strength and other physical properties. Comparative Examples 9 and 12 using a styrene monomer in place of the methyl methacrylate monomer were inferior in fast curing performance, tackiness and physical properties. On the other hand, according to the manufacturing method of mold under the present invention, the products were all distinguished in the fast curing performance, non-tackiness, non-foaming and fast moldability.

What is claimed is:

1. A resin composition comprising (a) 40 to 80% by weight of a resin comprising
   an oligomer having a number average molecular weight of 900 to 3,000 in terms of polystyrene equivalent obtained by gel permeation chromatography and having two or more terminal (meth)acrylate groups wherein said oligomer is a compound having a hydroxyl group as a side chain and having a (meth)acrylic acid group, a hydroxy(meth)acrylate group or a glycidyl(meth)acrylate group in the main chain, side chain or both terminals of the molecule thereof, said compound containing at least 10% by weight based on the weight of the oligomer of a (meth)acrylate group represented by the following formula

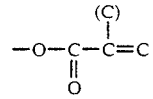

and
an unsaturated polyester containing 20 to 70% by weight of unsaturated dibasic acid, and
(b) 20 to 60% by weight of methyl (meth)acrylate monomer.

2. The resin composition as claimed in claim 1 wherein said oligomer is a compound having a hydroxyl group as a side chain and having (meth)acrylic acid group, a hydroxy(meth)acrylate group or a glycidyl(meth)acrylate group the main chain, side chain or both terminals of the molecule thereof, said compound containing 20 to 40% by weight based on the weight of the oligomer of a (meth)acrylate group represented by the following formula

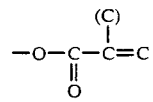

3. The resin composition as claimed in claim 2, wherein said oligomer is at least one member selected from the group consisting of epoxyacrylate and unsaturated polyester acrylate.

4. The resin composition as claimed in any one of claims 1 and 3, wherein the number average of molecular weight of said epoxyacrylate is 900 to 2,500.

5. The resin composition as claimed in any one of claims 1 and 3, wherein the number average of molecular weight of said unsaturated polyester acrylate is 1,500 to 3,000.

* * * * *